United States Patent
Guen

(10) Patent No.: US 10,944,092 B2
(45) Date of Patent: Mar. 9, 2021

(54) SECONDARY BATTERY

(71) Applicant: SAMSUNG SDI CO., LTD., Yongin-si (KR)

(72) Inventor: Min-Hyung Guen, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 77 days.

(21) Appl. No.: 14/619,528

(22) Filed: Feb. 11, 2015

(65) Prior Publication Data
US 2015/0270528 A1 Sep. 24, 2015

(30) Foreign Application Priority Data
Mar. 20, 2014 (KR) .................. 10-2014-0032739

(51) Int. Cl.
*H01M 2/34* (2006.01)
*H01M 2/26* (2006.01)
*H01M 10/052* (2010.01)
*H01M 10/0587* (2010.01)

(52) U.S. Cl.
CPC .......... *H01M 2/345* (2013.01); *H01M 10/052* (2013.01); *H01M 10/0587* (2013.01)

(58) Field of Classification Search
CPC .... H01M 2/345; H01M 10/052; H01M 10/36; H01M 10/0587
See application file for complete search history.

(56) References Cited

U.S. PATENT DOCUMENTS

| | | | | |
|---|---|---|---|---|
| 5,766,790 A * | 6/1998 | Kameishi | | H01H 37/54 220/203.01 |
| 6,342,826 B1 * | 1/2002 | Quinn | | H01H 35/343 337/13 |
| 7,164,092 B2 * | 1/2007 | Kawano | | H01H 3/12 200/310 |
| 2011/0039136 A1 * | 2/2011 | Byun | | H01M 2/0404 429/56 |
| 2012/0189884 A1 | 7/2012 | Guen | | |
| 2012/0237802 A1 * | 9/2012 | Byun | | H01M 2/043 429/61 |
| 2012/0288744 A1 * | 11/2012 | Guen | | H01M 2/206 429/158 |
| 2013/0029190 A1 | 1/2013 | Kim | | |

(Continued)

FOREIGN PATENT DOCUMENTS

| KR | 10-2012-0099167 | 9/2012 |
|---|---|---|
| KR | 10-2013-0013787 | 2/2013 |

OTHER PUBLICATIONS

Korean Office action issued in Korean Patent Application No. 10-2014-0032739, dated Apr. 20, 2020.

*Primary Examiner* — Sarah A. Slifka
*Assistant Examiner* — Brent C Thomas
(74) *Attorney, Agent, or Firm* — Lee IP Law, PC

(57) ABSTRACT

A secondary battery includes an electrode assembly including a first electrode plate, a second electrode plate and a separator, the separator being between the first and second electrode plates, a case accommodating the electrode assembly therein, the case having an opening, and a cap assembly sealing the opening of the case, the cap assembly having a short-circuit hole provided in one area thereof, a first reverse plate and a second reverse plate positioned on a top of the first reverse plate being provided in the short-circuit hole of the cap assembly.

10 Claims, 4 Drawing Sheets

(56) References Cited

U.S. PATENT DOCUMENTS

| | | | | |
|---|---|---|---|---|
| 2013/0029191 A1* | 1/2013 | Byun | .................... | H01M 2/024 429/61 |
| 2015/0207132 A1* | 7/2015 | Minagata | ................ | H01M 2/22 429/7 |
| 2015/0357679 A1* | 12/2015 | Sano | ................ | H01M 10/0566 429/94 |
| 2016/0293924 A1* | 10/2016 | Kovermann | .......... | H01M 2/202 |

* cited by examiner

SECONDARY BATTERY

CROSS-REFERENCE TO RELATED APPLICATION

Korean Patent Application No. 10-2014-0032739, filed on Mar. 20, 2014, in the Korean Intellectual Property Office, and entitled: "Secondary Battery," is incorporated by reference herein in its entirety.

BACKGROUND

1. Field

Embodiments relate to a secondary battery.

2. Description of the Related Art

As industries of electronics, communications, and the like have rapidly developed, the spread of portable electronic devices such as camcorders, cellular phones, and notebook PCs has increased. Accordingly, the use of secondary batteries has also increased. Secondary batteries are used not only for portable electronic devices but also for medium- and large-sized apparatuses such as electric tools, automobiles, space transportation systems, motorbikes, motor scooters, and aerial transportation systems, which require high output and high power.

SUMMARY

Embodiments are directed to a secondary battery including an electrode assembly including a first electrode plate, a second electrode plate and a separator, the separator being between the first and second electrode plates, a case accommodating the electrode assembly therein, the case having an opening, and a cap assembly sealing the opening of the case, the cap assembly having a short-circuit hole provided in one area thereof, a first reverse plate and a second reverse plate positioned on a top of the first reverse plate being provided in the short-circuit hole of the cap assembly.

The first reverse plate may be rounded downwardly toward a center of the first reverse plate from a circumference of the first reverse plate.

The second reverse plate may be rounded downwardly toward a center of the second reverse plate from a circumference of the second reverse plate. The second reverse plate may include a first area adjacent to the center of the second reverse plate and a second area extending from an outer circumference of the first area to the circumference of the second reverse plate. A protruding portion may be located along the outer circumference of the first area.

A first terminal portion and a second terminal portion may be located on a top of the cap assembly. A bottom surface of the first terminal portion may include a first accommodating groove and a second accommodating groove spaced apart from the first accommodating groove at a predetermined distance.

The first terminal portion may extend over a top of the short-circuit hole. The first and second accommodating grooves may be positioned over the top of the short-circuit hole.

A diameter of the protruding portion of the second reverse plate may correspond to the predetermined distance between the first and second accommodating grooves of the first terminal portion.

The first and second accommodating grooves may correspond to a shape of the protruding portion.

The protruding portion of the second reverse plate and the first and second accommodating grooves of the first terminal portion may be configured such that when an internal pressure of the case is higher than a predetermined pressure, the protruding portion of the second reverse plate contacts the first and second accommodating grooves of the first terminal portion.

The first terminal portion may be a negative electrode and the second terminal portion may be a positive electrode.

The second reverse plate may have a positive polarity.

The secondary battery may further include upper and lower insulating plates at top and bottom portions of the cap assembly, respectively.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
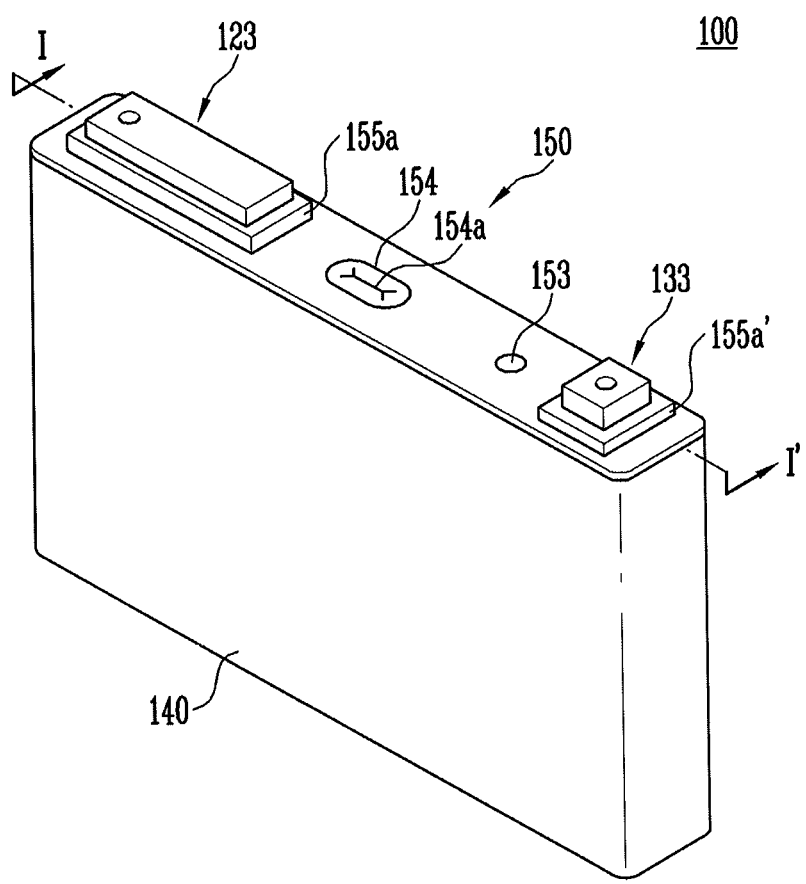
FIG. 1 illustrates a perspective view showing a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It is to be understood that when a layer or element is referred to as being "on" another layer or substrate, it can be directly on the other layer or substrate, or intervening layers may also be present. In addition, it also is to be understood that when a layer is referred to as being "between" two layers, it can be the only layer between the two layers, or one or more intervening layers may also be present. Like reference numerals refer to like elements throughout.

Figure 2:
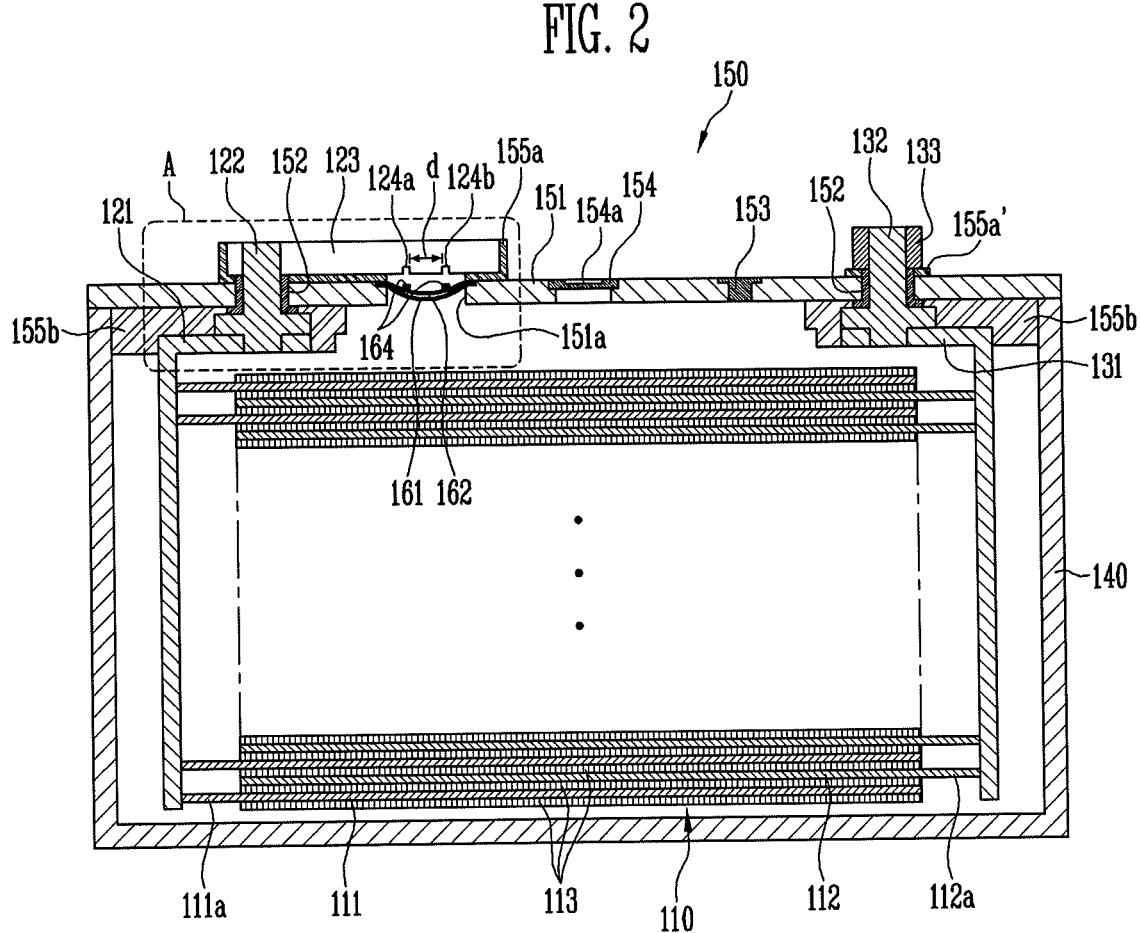
FIG. 2 illustrates a sectional view taken along line I-I'.

FIG. 1 illustrates a perspective view showing an external appearance of a secondary battery 100 according to an embodiment. FIG. 2 illustrates a sectional view taken along line I-I'.

As shown in FIGS. 1 and 2, the secondary battery 100 according to this embodiment may include an electrode assembly 110 configured to include a first electrode plate 111, a second electrode plate 112, and a separator 113 interposed between the first and second electrode plates 111 and 112, a case 140 configured to accommodate the electrode assembly 110 therein, the case 140 having one opened surface, and a cap plate 151 configured to seal the opening of the case 140, the cap plate 151 having a short-circuit hole 151a formed in one area thereof. The short-circuit hole 151a of the cap plate 151 may be provided with a first reverse plate 161 and a second reverse plate 162 positioned on the top of the first reverse plate 161.

The electrode assembly 110 may be manufactured in a jelly roll form by winding the first and second electrode plates 111 and 112 and the separator 113, which are laminated to each other, or may be manufactured in a stack form by stacking a plurality of first and second electrode plates 111 and 112 and a plurality of separator 113. In other implementations, the electrode assembly 110 may be manufactured using both winding and stacking processes.

The first electrode plate 111 may include a first active material coating portion formed by intermittently coating a first active material on a first base material that is a sheet-shaped conductive material, and a first non-coating portion 111a that is a portion at which the first active material is not coated, such that the first base material is exposed. The first non-coating portion 111a may be provided to protrude to one side of the first electrode plate 111. For example, the first electrode plate 111 may be a negative electrode plate, and the first active material may be a negative electrode active material including a carbon material such as crystalline carbon, amorphous carbon, carbon composite or carbon fiber, lithium metal, or lithium alloy.

The second electrode plate 112 has a different polarity from the first electrode plate 111. The second electrode plate 112 may include a second active material coating portion formed by intermittently coating a second active material on a second base material that is a sheet-shaped conductive material, and a second non-coating portion 112a that is a portion at which the second active material is not coated, such that the second base material is exposed. The second non-coating portion 112a may be provided to protrude to at one side of the second electrode plate 112. For example, the second electrode plate 112 may be a positive electrode plate, and the second active material may be a positive electrode active material including lithium, such as $LiCoO_2$, $LiNiO_2$, $LiMnO_2$, $LiMn_2O_4$ or $LiNi_{1-x-y}Co_xM_yO_2$.

The separator 113 may be positioned between the first and second electrode plates 111 and 112 to be wound. The separator 113 may insulate the first and second electrode plates 111 and 112 from each other. The separator 113 may enable lithium ions to be exchanged between the first and second electrode plates 111 and 112. The separator 113 may be formed to a sufficient length to completely insulate between the first and second electrode plates 111 and 112 even though the electrode assembly 110 may contract and expand.

The first or second base material may act as a collector of current or electrons, and may include a thin-film shaped metal. For example, the first base material may include copper, and the second base material may include aluminum. The first and second electrode plates 111 and 112 may discharge ions into an electrolyte to generate a flow of current or electrons, and the current or electrons may be transferred to an outside of the electrode assembly through the first and second non-coating portions 111a and 112a. The first non-coating portion 111a may be a negative electrode, and the second non-coating portion 112a may be a positive electrode.

The case 140 may be formed in the shape of a rectangular parallelepiped having one opened portion, to accommodate the electrode assembly 110 and the electrolyte therein. The opening may be sealed by a cap assembly 150. Although it is illustrated in FIG. 1 that the case 140 is a rectangular parallelepiped, in other implementations, the case 140 may have other configurations. For example, the case 140 may be manufactured as a cylindrical case, a pouch-type case, a coin-type case, or the like.

The cap assembly 150 may include the cap plate 151 configured to seal the opening of the case 140, the cap plate 151 having the short-circuit hole 151a, the first and second reverse plates 161 and 162 provided in the short-circuit hole 151a, and first and second terminal portions 123 and 133 positioned on the top of the cap plate 151.

The first and second terminal portions 123 and 133 may be electrically connected to the first and second non-coating portions 111a and 112a by the medium of first and second connection terminals 122 and 132 bonded to first and second collectors 121 and 131, respectively. A sealing gasket 152 for sealing may be further provided in a hole through which the connection terminal 122 or 132 penetrates into the first or second terminal portion 123 or 133 and the cap plate 151. In addition, insulating plates 155a and 155b may be further formed on the top and bottom of the cap plate 151, respectively. In this state, the insulating plates 155a and 155b may be limited to the area of the first terminal portion 123. In other implementations, the insulating plate 155b may also be present between the cap plate 151 and a bottom portion of the second connection portion and between the cap plate 151 and the second current collector 131. The second terminal portion 133 may be electrically connected to the cap plate 151 through a conductive member 155a' located between the top of the cap plate 151 and the bottom of the second terminal portion 133. The cap plate 151, the case 140 and the second terminal portion 133 may be electrically charged as a positive electrode, and the first terminal portion 122 may be electrically charged as a negative electrode. Thus, it may be possible to prevent the occurrence of an undesired short circuit between the first terminal portion 123 and the first and second reverse plates 161 and 162, which will be described below.

The cap plate 151 may be further provided with a vent hole and a vent plate 154 having a notch 154a formed such that the vent plate 154 may be opened at a predetermined pressure.

Figure 3:
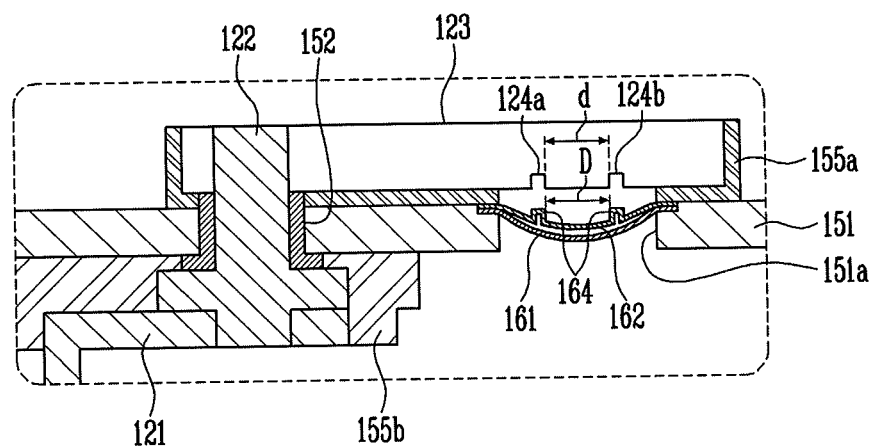
FIG. 3 illustrates an enlarged view of portion A of FIG. 2.

FIG. 3 illustrates an enlarged view of portion A of FIG. 2.

As shown in FIG. 3, the short-circuit hole 151a may be provided in one area of the cap plate 151, and the first and second reverse plates 161 and 162 are provided in the short-circuit hole 151a. The short-circuit hole 151a may be covered by the first terminal portion 123. The first terminal portion 123 may be provided on the top of the cap plate, and may be formed to protrude over the top of the short-circuit hole 151a. A first accommodating groove 124a and a second accommodating groove 124b spaced apart from the first accommodating groove 124a at a predetermined distance may be formed in the bottom surface of the terminal portion 123. For example, the first and second accommodating grooves 124a and 124b may be positioned over the top of the short-circuit hole 151a, and may be formed to correspond to the shape of a protruding portion 164 of the second reverse plate 162 which will be described below.

Figure 4:
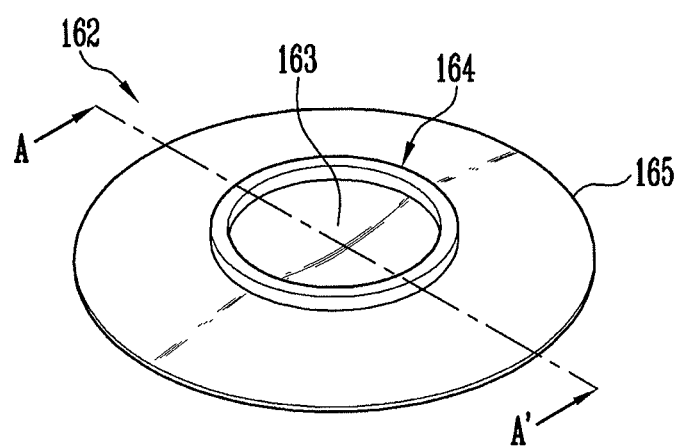
FIG. 4 illustrates a perspective view of a second reverse plate.
Figure 5:
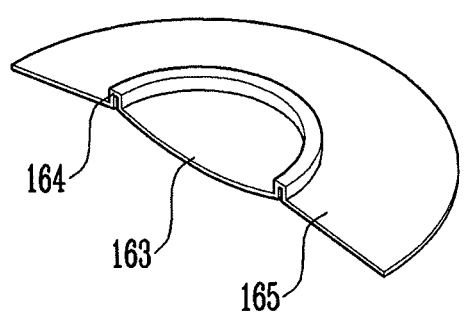
FIG. 5 illustrates a sectional view taken along line A-A' of FIG. 4.

FIG. 4 illustrates a perspective view of the second reverse plate. FIG. 5 illustrates a sectional view taken along line A-A' of FIG. 4.

As shown in FIGS. 4 and 5, the second reverse plate 162 may be formed to be downwardly rounded toward the center from the circumference of the second reverse plate 162. Herein, "downwardly" refers to a direction toward an interior of the secondary battery. The second reverse plate 162 may include a first area 163 adjacent to the center thereof and a second area 165 that extends from the outer circumference of the first area 163 to the circumference of the second reverse plate 162.

The protruding portion 164 may be formed to protrude along the outer circumference of the first area 163. The diameter D of the protruding portion 164 may be formed to correspond to the distance d between the first and second accommodating grooves 124a and 124b of the first terminal portion 123. When the protruding portion 164 of the second reverse plate 162 is formed as described above, it may be possible to minimize damage of the first and second reverse plates 161 and 162 when a short circuit is caused by pressure.

Figure 6:
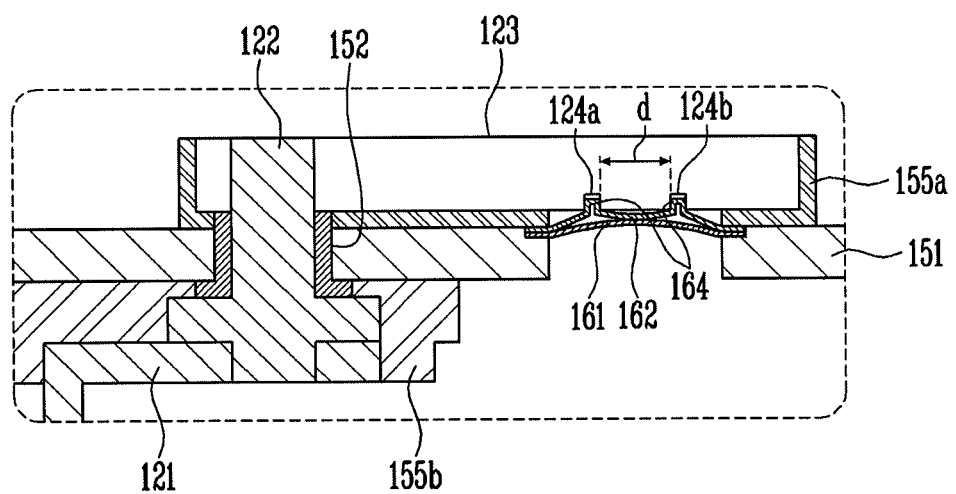
FIG. 6 illustrates an operational state view.

FIG. 6 illustrates an operational state view.

As shown in FIG. 6, according to this embodiment, if the internal pressure of the secondary battery exceeds a predetermined pressure, the first and second reverse plates 161 and 162 are reversed by the pressure so that the protruding portion 164 of the second reverse plate 162 contacts the first and second accommodating grooves 124a and 124b of the first terminal portion 123, thereby inducing a short circuit. The first terminal portion 123 and the second reverse plate 162 may have different polarities from each other such that the short circuit may be stably induced. For example, the first terminal portion 123 may have a negative polarity, and the first and second reverse plates 161 and 162 may have a positive polarity.

If gas is generated inside the secondary battery 100 due to an abnormal reaction, the internal pressure of the secondary battery 100 increases. If the increased internal pressure is higher than the predetermined pressure, the first reverse plate 161 is reversed to be upwardly convex, and the second reverse plate 162 is expanded as internal air is compressed due to the deformation of the first reverse plate 161. In this state, as the second reverse plate 162 is reversed, the protruding portion 164 contacts the first and second accommodating grooves 124a and 124b of the first terminal portion 123, thereby inducing a short circuit.

By way of summation and review, a high-power secondary battery using a non-aqueous electrolyte with high energy density has recently been developed. The high-power secondary battery may be configured as a large-capacity secondary battery manufactured by connecting a plurality of secondary battery cells in series so as to be used in driving motors of devices requiring high power, e.g., electric vehicles and the like.

One large-capacity secondary battery generally includes a plurality of secondary battery cells connected in series. The shape of each secondary battery cell may be one of various types, such as a cylinder type, a square type, a rectangular parallelepiped type, or the like.

When a short circuit occurs inside a secondary battery or when a short circuit occurs due to an external foreign substance, overcurrent flows in the secondary battery. If the overcurrent continuously flows, excessive heat may be generated inside the secondary battery, and the secondary battery may explode or ignite.

Embodiments provide a secondary battery having a structure capable of improving the safety of the secondary battery in overcurrent conditions.

Embodiments also provide a secondary battery having a structure in which a short circuit is easily induced when the internal pressure of the secondary battery is higher than a predetermined pressure. A short circuit may be easily induced, such that it may be possible to prevent explosion or igniting of the secondary battery, thereby improving the safety of the secondary battery.

Further, a protruding portion is provided to a second reverse plate according to an embodiment, so that it may be possible to minimize damage of the second reverse plate when a short circuit is induced, thereby allowing the second reverse plate to be reused and reducing material costs.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A secondary battery, comprising:
an electrode assembly including a first electrode plate, a second electrode plate and a separator, the separator being between the first and second electrode plates;
a case accommodating the electrode assembly therein, the case having an opening; and
a cap assembly sealing the opening of the case, the cap assembly including a cap plate, first and second terminal portions coupled to the first and second electrode plates, respectively, and a short-circuit connector having first and second conducting and deformable plates that are configured to seal an internal air layer therebetween such that the internal air layer is compressed when the first conductive and deformable plate is deformed toward the second conducting and deformable plate, the cap plate having a short-circuit hole in which the first and second conducting and deformable plates are provided, the second conducting and deformable plate being positioned on a top of the first conducting and deformable plate, wherein:
the second conducting and deformable plate has a protruding portion, the protruding portion protruding in a first direction from inside to outside of the case,
the first terminal portion is on a top of the cap assembly, extends from the first electrode plate to cover the short-circuit hole, and has an accommodating groove for accommodating the protruding portion of the second conducting and deformable plate when the short-circuit connector is deformed, the accommodating groove having a bottom surface, and
inside and outside diameters of the protruding portion of the second conducting and deformable plate are respectively the same as inside and outside diameters of the accommodating groove of the first terminal portion in second and third directions perpendicular to each other such that inner and outer lateral surfaces of the protruding portion of the second conducting and deformable plate respectively contact inner and outer lateral surfaces of the accommodating groove of the first terminal portion to flow a short-circuit current through connections between the inner and outer lateral surfaces of the protruding portion and the inner and outer lateral surfaces of the accommodating groove when the second conducting and deformable plate is deformed.

2. The secondary battery as claimed in claim 1, wherein the first conducting and deformable plate is rounded downwardly toward a center of the first conducting and deformable plate from a circumference of the first conducting and deformable plate.

3. The secondary battery as claimed in claim 1, wherein:
the second conducting and deformable plate is rounded downwardly toward a center of the second conducting and deformable plate from a circumference of the second conducting and deformable plate,
the second conducting and deformable plate includes a first area adjacent to the center of the second conducting and deformable plate and a second area extending from an outer circumference of the first area to the circumference of the second conducting and deformable plate, and wherein, the protruding portion of the second conducting and deformable plate is located along the outer circumference of the first area.

4. The secondary battery as claimed in claim 3, wherein the second terminal portion is located on the top of the cap plate, and
a bottom surface of the first terminal portion includes the accommodating groove having the inside diameter and the outside diameter, and wherein
the protruding portion of the second conducting and deformable plate is inserted in the accommodating groove when the second conducting and deformable plate is deformed such that a short circuit occurs between the first and second electrode plates by the second conducting and deformable plate.

5. The secondary battery as claimed in claim 4, wherein the accommodating groove is positioned over a top of the short-circuit hole.

6. The secondary battery as claimed in claim 4, wherein:
the accommodating groove has a closed shape, and
the protruding portion has the closed shape.

7. The secondary battery as claimed in claim 4, wherein the protruding portion of the second conducting and deformable plate and the accommodating groove of the first terminal portion are configured such that when an internal pressure of the case is higher than a predetermined pressure, the protruding portion of the second conducting and deformable plate contacts the accommodating groove of the first terminal portion.

8. The secondary battery as claimed in claim 4, wherein the first terminal portion is a negative electrode and the second terminal portion is a positive electrode.

9. The secondary battery as claimed in claim 1, wherein the second conducting and deformable plate has a positive polarity.

10. The secondary battery as claimed in claim 1, further comprising upper and lower insulating plates at top and bottom portions of the cap plate, respectively.

* * * * *